(12) United States Patent
Milkowski (10) Patent No.: US 10,595,659 B2
(45) Date of Patent: Mar. 24, 2020

(54) SYSTEM, APPARATUS, AND METHOD TO ATTACH AND SECURE DECORATIVE ACCESSORY, COVER, DISGUISE, AND / OR ENHANCEMENT TO OTHER ITEMS AND / OR FIXTURES

(71) Applicant: Kellyann Parrillo Milkowski, Bridgeport, CT (US)

(72) Inventor: Kellyann Parrillo Milkowski, Bridgeport, CT (US)

( * ) Notice: Subject to any disclaimer, the term of this patent is extended or adjusted under 35 U.S.C. 154(b) by 218 days.

(21) Appl. No.: 15/261,896

(22) Filed: Sep. 10, 2016

(65) Prior Publication Data

US 2017/0127869 A1 May 11, 2017

Related U.S. Application Data

(60) Provisional application No. 62/216,675, filed on Sep. 10, 2015.

(51) Int. Cl.
| | |
|---|---|
| *A47G 33/10* | (2006.01) |
| *F16B 2/24* | (2006.01) |
| *F16B 1/00* | (2006.01) |
| *F16B 2/20* | (2006.01) |

(52) U.S. Cl.
CPC ............... *A47G 33/10* (2013.01); *F16B 1/00* (2013.01); *F16B 2/20* (2013.01); *F16B 2/24* (2013.01); *F16B 2/245* (2013.01); *F16B 2001/0035* (2013.01)

(58) Field of Classification Search
CPC .... A47F 33/10; F16B 1/00; F16B 2/20; F16B 2/24; F16B 2/245; F16B 2001/0035
See application file for complete search history.

(56) References Cited

U.S. PATENT DOCUMENTS

| | | | | |
|---|---|---|---|---|
| 6,155,526 | A  * | 12/2000 | Brown | A47G 33/10 248/205.1 |
| 6,921,561 | B1 * | 7/2005 | Maier | A47G 33/08 24/343 |
| 9,833,099 | B1 * | 12/2017 | Ring | A47G 33/10 |
| 9,895,017 | B1 * | 2/2018 | Berry | A47G 33/10 |
| 2015/0272369 | A1 * | 10/2015 | Quaine | A47G 33/06 428/8 |
| 2016/0066661 | A1 * | 3/2016 | Sozio | A44C 5/20 63/12 |

* cited by examiner

*Primary Examiner* — Victor D Batson
*Assistant Examiner* — Matthew J Sullivan (57) ABSTRACT

The main embodiment is a system, apparatus, and method for attaching a decorative accessory, ornament, cover, disguise, and or enhancement to an item and/or fixture. The system, apparatus, and method comprising two components, one piece with magnetic properties, referred herein as first end A and second end B that can be arranged around or attached to myriad surfaces and/or items, and one piece referred herein as decorative linking component D which includes decorative housing F, magnetic element E, and various connector G, and links decorative accessory to the fixture or other item.

8 Claims, 12 Drawing Sheets

SYSTEM, APPARATUS, AND METHOD TO ATTACH AND SECURE DECORATIVE ACCESSORY, COVER, DISGUISE, AND / OR ENHANCEMENT TO OTHER ITEMS AND / OR FIXTURES

This application claims benefit to U.S. Provisional Application 62/216,675 filed Sep. 10, 2015.

FIELD

The present invention relates to systems, apparatuses, and methods for attaching decorative accessory, ornament, cover, disguise, and or enhancement to surfaces, items, and or fixtures. In particular, but not by way of limitation, the present invention relates to systems, apparatuses, and methods for securing decorative accessory, ornament, cover, disguise, and or enhancement to indoor and/or outdoor trees, and/or fixtures such as fences, gutters, mailboxes, railings, etc, and/or other items.

BACKGROUND

Many individuals enjoy decorating their homes and/or offices during times of holiday observance to inspire good cheer and joy, to acknowledge religious obligations, and as a way to celebrate. Specifically, the tradition of decorating a Christmas tree has long been held in western cultures.

The Christmas tree, decorated in ornaments of wonderful variety, has come to be a symbol of the holiday season. It is, however, also a safety concern for parents of young children and or owners of pets. Currently, decorations and ornaments are attached directly to a Christmas tree, typically by string or hook, in such a way that renders the ornament secured to the Christmas tree so that the ornament will not easily detach from the tree. This dated way of attaching ornaments creates a hazardous situation for young children and/or pets who may pull, swat, and/or otherwise attempt to remove an ornament because the attached ornament is fastened securely directly to the branch; rather than be removed from the tree or other fixture easily when disturbed it can pull the entire tree or fixture down onto the child and/or pet, which can lead to injury and/or other damages.

Further, often the joy of decorating a Christmas tree both inside the home and outdoors, has lessened as many people have an ever growing list of obligations. The time spent attaching each individual decorating to each individual branch is extensive, especially considering the short duration of the season. Additionally, the mounting of ornaments to a Christmas tree and other fixtures or items can be physically difficult for any individual who lacks dexterity in the hands and fingers.

For these and other reasons, the present invention is ideal for attaching, assembling, joining, adhering, hanging, mounting, linking, and/or securing decorative accessory, ornament, cover, disguise, and or enhancement to Christmas trees, other items, and/or other fixtures. The present invention allows for the decorative accessory, ornament, cover, disguise, and or enhancement to be attached, hung, mounted, linked and/or secured while allowing for quick release and re-application should the need arise. Further, the present invention reduces overall assembly time of a fully decorated Christmas tree, other items, and/or fixtures in future or subsequent applications.

Decorative accessory, ornament, cover, disguise, and or enhancements are manufactured out of myriad materials and in a variety of shapes, sizes, colors, and/or designs dependent on each individual brand and manufacturer. Any design and/or material of the decorative accessory, ornament, cover, disguise, and or enhancement manufactured and sold under any brand is compatible to the correct use, application or enjoyment of the system apparatus and method of the present invention as described in this application. The method, system and apparatus of the present invention as described in this application can be correctly used, applied or enjoyed with any Christmas tree, whether live, fresh cut, or artificial; other items, and/or other fixtures.

Creating a safe, easy method, apparatus, and system to link, attach, secure, mount and/or join a decorative accessory, ornament, cover, disguise, and or enhancement to a Christmas tree, other items, and/or fixtures was a challenge because the ornament must remain secure unless pulled or otherwise displaced by a person or animal. More over, the method, apparatus, and system, needed to be quickly and easily re-assembled when displaced. Finally, total ease of use for all facets of the method, system, and apparatus was a concern for the end consumer. Also challenging is the differences in the width and thickness of Christmas tree branches, other items, and/or other fixtures one might choose to decorate or enhance using the present invention. The difference in size makes it difficult to design an apparatus, system, and method with the capacity and capability of fitting any type of tree branch, whether live, freshly cut, or artificial, or other item or fixture regardless of size or shape.

SUMMARY OF THE INVENTION

Depictions of the present invention illustrated in the drawings are summarized below. These and other embodiments are more extensively described in the Detailed Description section. It is important to note that there is no intention to limit the scope of the invention to the manifestations, formations, configurations, or arrangements described in this Summary of the Invention or in the Detailed Description. One skilled in the art can recognize that there are innumerable variations, adjustments, adaptations, and comparable and alternative constructions that lie within the essence and scope of the invention as expressed in the claims.

Depictions of the present invention illustrated in the drawings show a method system and apparatus that secures a decorative accessory, ornament, cover, disguise, and or enhancement to a Christmas tree, other items, and/or fixtures. The apparatus, system, and method comprises a thin clip with a first end A and a second end B with middle section C that secures, attaches, and/or tie onto the Christmas tree branch or other item or fixture by slipping onto the branch or other item. Middle section C sits flush on the branch or other item, first end A and second end B can hang down from the middle section, both exposed; first end A and/or second end B can be wrapped around the branch or other item; and/or first end A and/or second end B can be wrapped around the other end.

First end A, remains exposed on the Christmas tree branch or other item or fixture and the second end B, can be left to hang, wrapped around the branch or other item or fixture, or wrapped around First end A, dependent on end user preference as all three methods are compliant with the effective use of the present invention. The clip comprises materials that have magnetic properties either in whole or in part.

The apparatus, system, and method also comprises a decorative linking element D that incorporates one or more decorative housings F and/or one or more magnetic components E. The decorative linking element D can comprise any material, including but not limited to semi-precious stones, stones, acrylic, plastic, glass, metal, wood, ceramic, etc. The decorative linking elements D are variable in form and design, and can be of any shape any size and any color and can also resemble characters or other designs. The decorative housing F of decorative linking element D is comprised of any material, including but not limited to metal, ceramic, acrylic, plastic, glass, wood, stones, semi-precious stones, etc. The shape and size and design of magnetic component E are variable and can take any form or color. The decorative linking element D also has a various connector G that can be a loop, hook, hole, post, or other receptive section that holds the hook or string or other item to attach the decorative accessory, ornament, cover, disguise, and or enhancement. The decorative accessory, ornament, cover, disguise, and or enhancement is attached to the decorative linking element D by way of string hook or other material secured to various connector G; the decorative linking element D comprising of magnetic component E engages the exposed section of the clip first end A that is comprised of materials with magnetic properties; the clip is attached to the Christmas tree branch or other item or fixture by second end B.

DETAILED DESCRIPTION

Referring to FIGS. 1 through 8, multiple variations of the manifestation of the shape, design, and/or position. The illustrations show first end A and second end B to be similar in length, however, this is not integral to the correct use of the present invention and is not meant to limit the scope of the present invention in anyway.

The clip is of equal thickness throughout the length from first end A, through middle section C, to second end B. The clip can be comprised of a singular length of material consisting magnetic properties, which is bent at the segment referred to as outer end C. The clip can also be comprised of a primary length of material with a secondary flat piece of material consisting of magnetic properties adhered to the primary length of material at the section of first end A by any means including but not limited to glue, welding, etc. Whether the clip is comprised of a singular length of material or is comprised of a primary length of material with a secondary piece is inconsequential to the correct use of the present invention and is not intended to limit the scope of the present invention in any way. For ease of illustration all drawings depict the clip as a singular length of material consisting of magnetic properties.

The first end A is flat in dimension and can be of any shape size or thickness. The drawings in FIGS. 1 through 4 depict first end A as circular, this is for illustrative purposes only and is not intended to limit the scope of the present invention in any way. The first end A will remain exposed when properly applied to Christmas tree or other item or fixture ready to engage magnetic component E of the decorative linking element D.

The second end B can be allowed to hang straight, can be wrapped around the Christmas tree branch or other item or fixture, can be wrapped around the portion of clip between first end A and middle section C, and/or otherwise utilized to attach, secure, and/or mount the clip to Christmas tree branch or other item or fixture.

The middle end C may or may not remain exposed in whole or in part after the clip has been attached, secured, and/or mounted to the Christmas tree branch or other item or fixture. The efficacy of the present invention is not affected whether or not middle end C remains exposed or is concealed in whole or in part.

Figure 1:
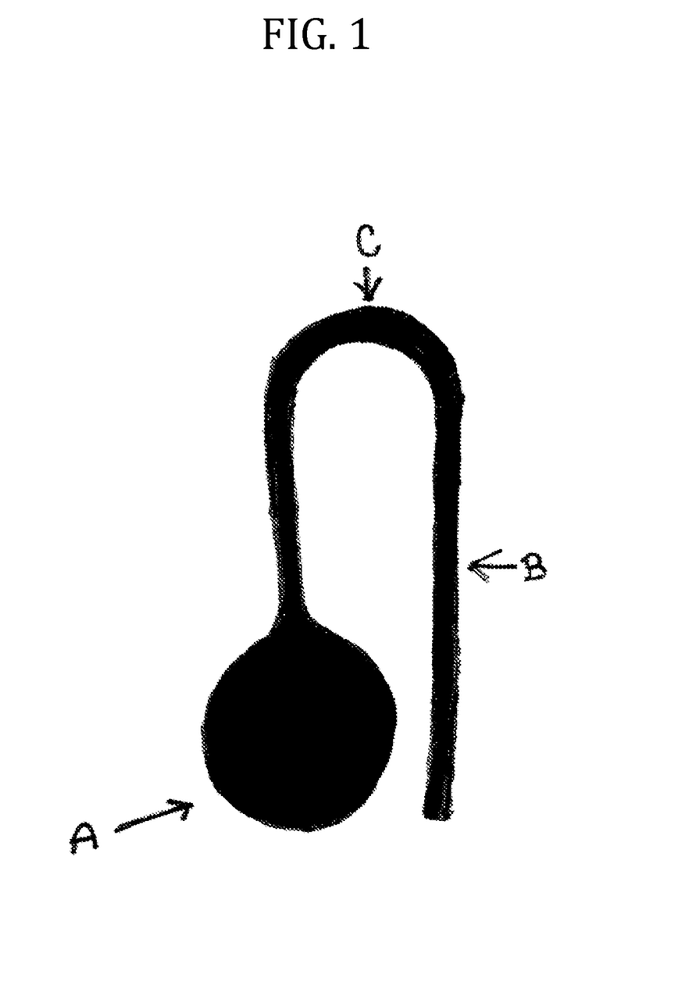
FIG. 1 is a front view of the clip, showing the first end A and the second end B. It is to the first end A that decorative linking element D containing the magnetic component E is engaged.

Referring to FIG.1, a front view of the clip, showing the first end A and the second end B. It is to the first end A that the decorative linking element D containing the magnetic component E is engaged. The first end A is flat in dimension. The first end A can be of any shape, size, or thickness. The decorative linking element D containing the magnetic component F can be engaged to either side of the first end A.

Figure 2:
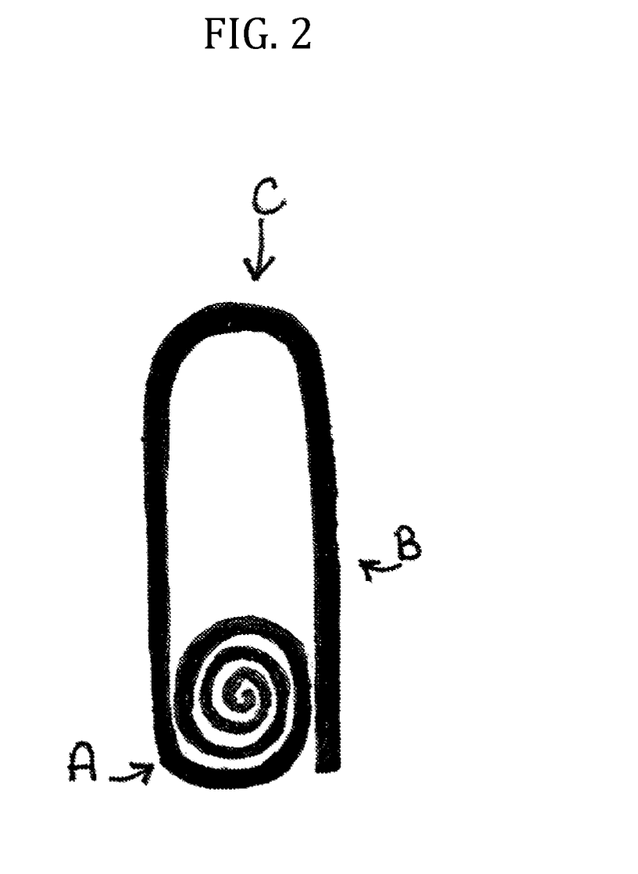
FIG. 2 is a front view of an alternative manifestation of the clip, showing the first end A and the second end B. It is to the first end A that decorative linking element D containing the magnetic component E is engaged.

Referring to FIG. 2, a front view of an alternative manifestation of the clip, showing the first end A and the second end B. It is to the first end A that the decorative linking element D containing the magnetic component E is engaged. The first end A is flat in dimension. The first end A can be of any shape, size, or thickness. The decorative linking element D containing the magnetic component E can be engaged to either side of the first end A.

Figure 3:
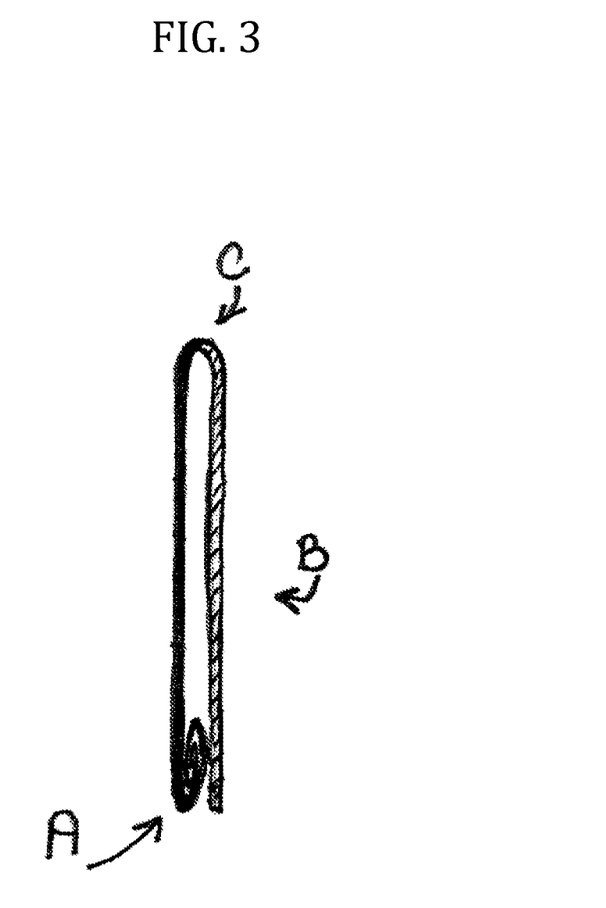
FIG. 3 is an angled side view of the clip, showing the first end A and the second end B.

Referring to FIG. 3, is an angled side view of the clip, showing the first end A and the second end B. It is to the first end A that the decorative linking element D containing the magnetic component E is engaged. The first end A is flat in dimension. The first end A can be of any shape, size, or thickness. The decorative linking element D containing the magnetic component E can be engaged to either side of the first end A.

Figure 4:
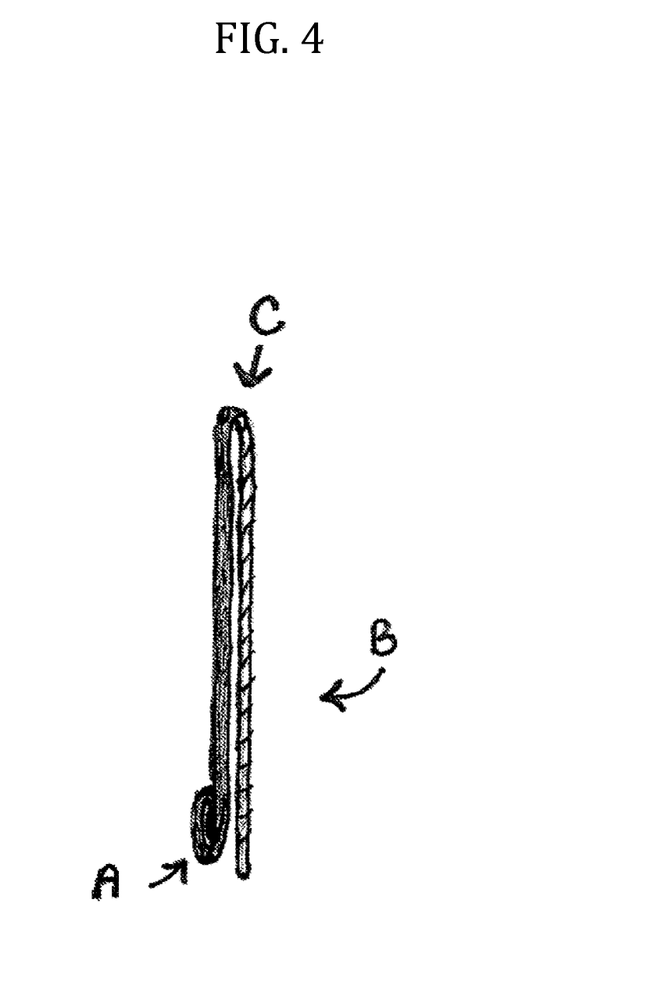
FIG. 4 is an angled reverse side view of the clip, showing an alternative manifestation of the clip first end A.

Referring to FIG. 4, is an angled reverse side view of the clip, showing an alternative manifestation of the clip first end A. It is to the first end A that the decorative linking element D containing the magnetic component E is engaged. The first end A is flat in dimension. The first end A can be of any shape, size, or thickness. The decorative linking element D containing the magnetic component E can be engaged to either side of the first end A.

Figure 5:
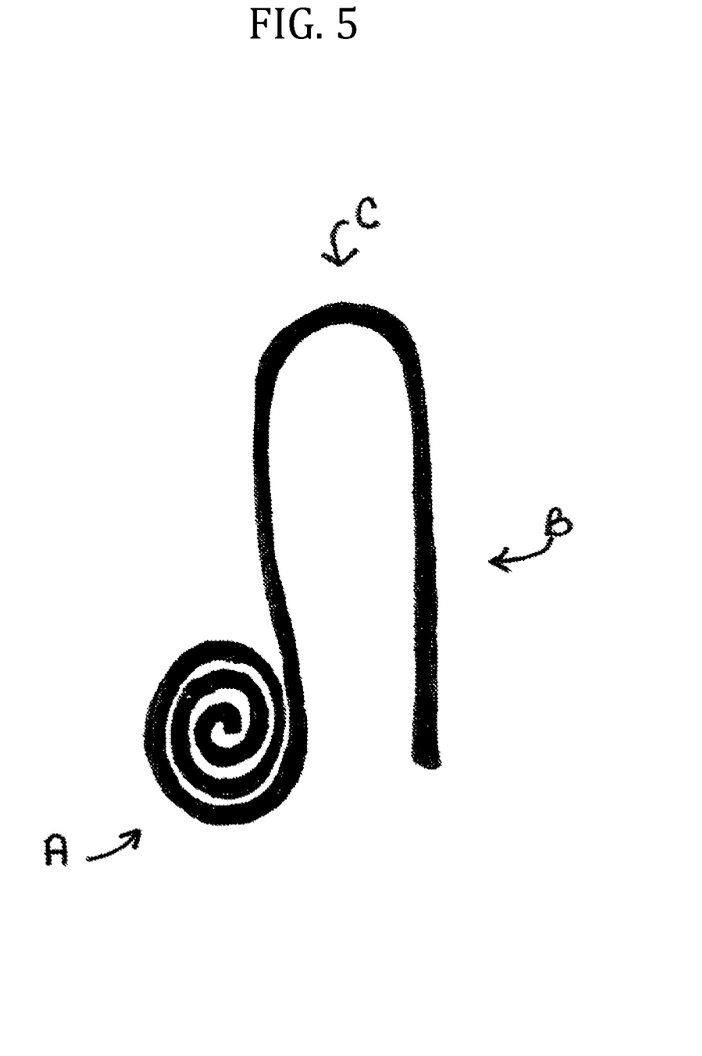
FIG. 5 is a front view of an alternative manifestation of the clip, showing the first end A and the second end B. It is to the first end A that decorative linking element D containing the magnetic component E is engaged.

Referring to FIG. 5, a front view of an alternative manifestation of the clip, showing the first end A and the second end B. It is to the first end A that the decorative linking element D containing the magnetic component E is engaged. The first end A is flat in dimension. The first end A can be of any shape, size, or thickness. The decorative linking element D containing the magnetic component E can be engaged to either side of the first end A.

Figure 6:
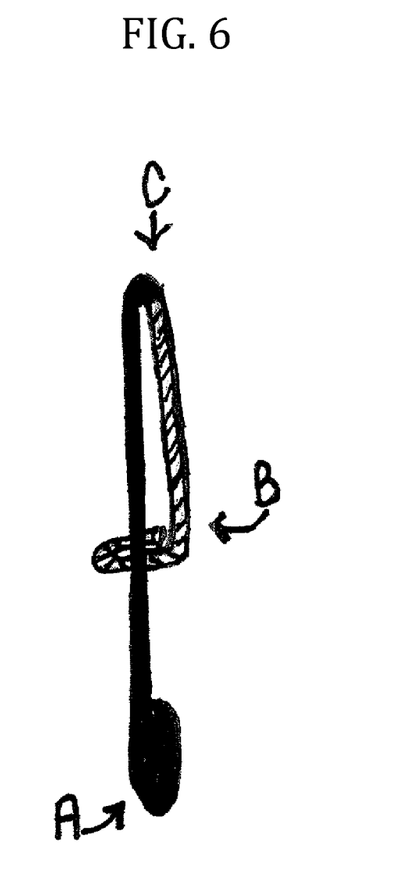
FIG. 6 is an angled side view of the clip, showing the first end A and the second end B, illustrating one of the ways the second end B can wrap the section of the clip between first end A and middle section C securing the clip to the Christmas tree branch or other item or fixture.

Referring to FIG. 6, an angled side view of the clip, showing the first end A and the second end B, illustrating one of the ways the second end B can wrap the section of the clip between first end A and middle section C securing the clip to the Christmas tree branch or other item or fixture.

Figure 7:
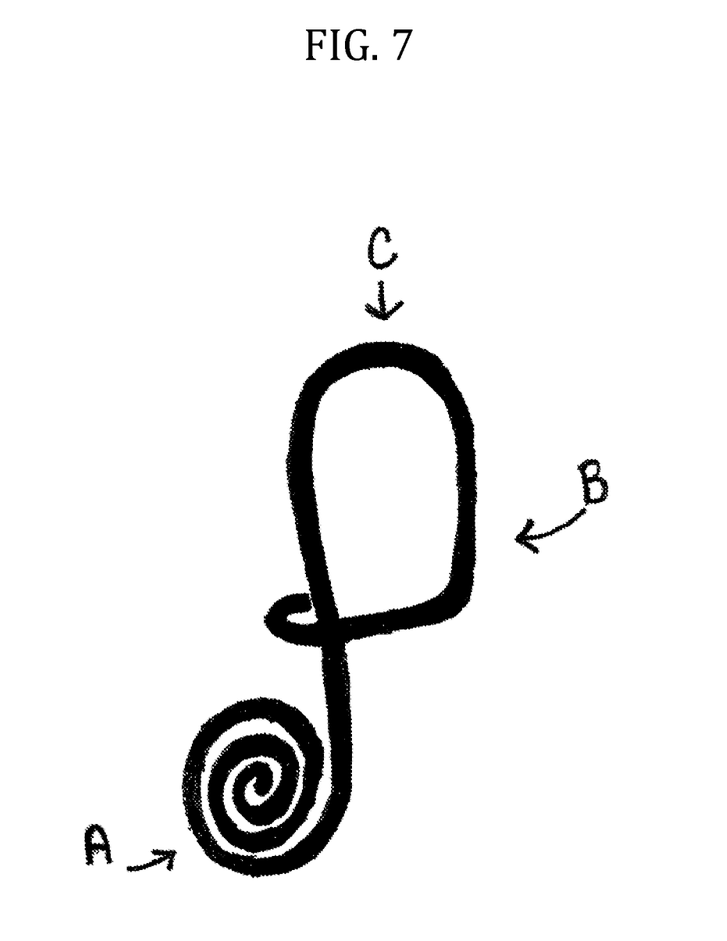
FIG. 7 is a front view of the clip, showing the first end A and the second end B, illustrating one of the ways the second end B can wrap first end A securing the clip to the Christmas tree branch or other item or fixture.

Referring to FIG. 7, a front view of the clip, showing the first end A and the second end B, illustrating one of the ways the second end B can wrap the section of the clip between first end A securing the clip to the Christmas tree branch or other item or fixture.

Figure 8:
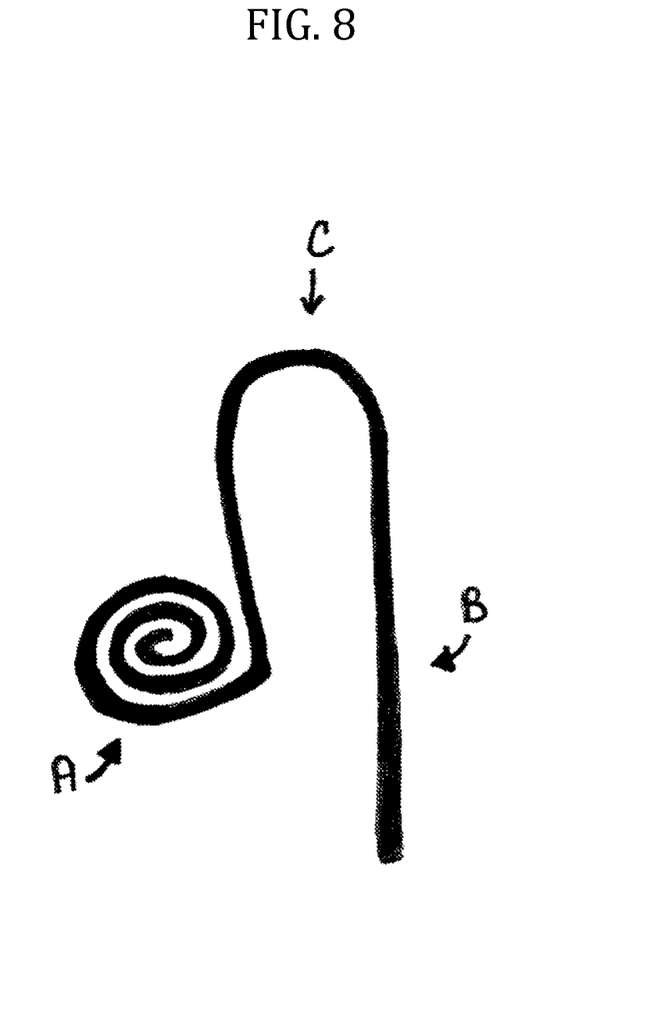
FIG. 8 is a front view of the clip, showing the first end A and the second end B, illustrating an alternative position of the first end A to maintain exposure to engage the decorative linking element D containing the magnetic component E while attached to the Christmas tree branch or other item or fixture.

Referring to FIG. 8, is a front view of the clip, showing the first end A and the second end B, illustrating an alternative position of the first end A to maintain exposure to engage the decorative linking element D containing the magnetic component E while attached to the Christmas tree branch or other item or fixture.

Referring to FIGS. 9 through 12, variations of the decorative linking element D consisting the decorative housing F, magnetic component E, and various manifestations of the connector G. The decorative linking element D can be any size, shape, figure, color, material, dimension, design, etc. The drawings depict a decorative linking element D in the shape of a partial or half sphere, which is solely for the purposes of illustration and is not intended to limit the scope of the present invention in any way. The decorative linking element D can be one singular material piece incorporating the decorative housing F, magnetic component E, and any manifestation of connector G. Alternatively, the decorative linking element D can be an assembled whole piece where the individual segments decorative housing F, magnetic component E, and any manifestation of connector G are made separately of various materials and then subsequently constructed using any method including but not limited to glue, welding, interlocking pieces, etc. The materials used to construct the decorative linking element D are inconsequential to the correct use of the present invention, with the exception of the magnetic component E which must consist of materials that are magnetic. The drawings depict decorative linking element D consisting of the decorative housing F and various manifestations of connector G comprising one singular construction of the same material incorporating a separate segment magnetic component E. The depictions are for ease of illustration and are not intended to limit the scope of the present invention in any way.

The drawings include one illustration of one manifestation of the clip first end A and second end B, where the first end A corresponds to magnetic component E to demonstrate the proper engagement of the present invention. The additional figures illustrate multiple possible manifestations of the decorative linking element D.

Attached to the Christmas tree or other item or fixture by the clip second end B first end A engages the decorative linking element D to which the decorative accessory, ornament, cover, disguise, and or enhancement, indicated by dashed line, is attached at various connector G. The size, shape, material, etc. of the decorative accessory, ornament, cover, disguise, and or enhancement is inconsequential to the correct use of the present invention. The present depiction of the decorative accessory, ornament, cover, disguise, and or enhancement is for illustrative purposes only and is not intended to limit the scope of the invention in any way.

Figure 9:
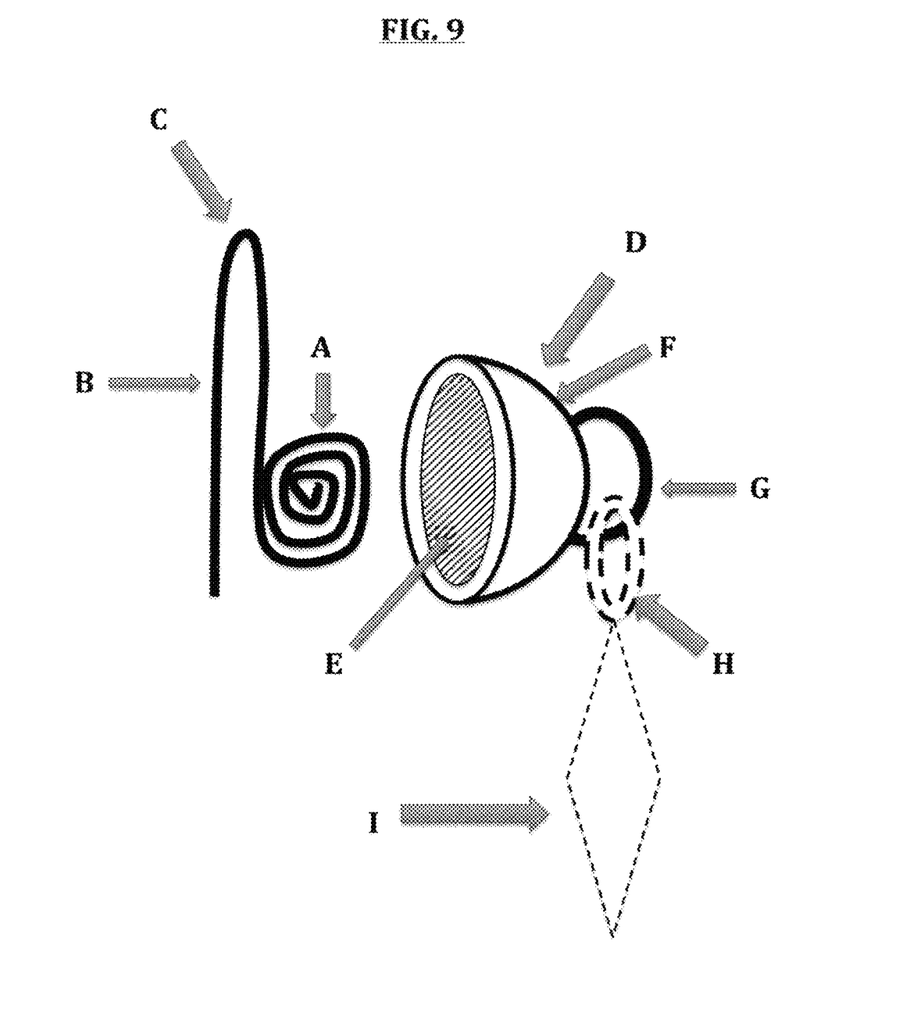
FIG. 9 is a front view of the clip showing the first end A and the second end B and one manifestation of the decorative linking element D comprising the decorative housing F, magnetic component E, and various connector G here illustrated as a loop, to attach a decorative accessory, ornament, cover, disguise, and or enhancement.

Referring to FIG. 9, a front view of the clip showing the first end A and the second end B and one manifestation of the decorative linking element D comprising the decorative housing F, magnetic component E, and various connector G, in this illustration a loop, to attach an decorative accessory, ornament, cover, disguise, and or enhancement. The drawing illustrates the proper engagement of the decorative linking element D to the clip by uniting the magnetic component E with the first end A, which comprises magnetic properties. The decorative accessory, ornament, cover, disguise, and or enhancement, indicated by dash line, to be attached to the Christmas tree or other item or fixture is secured to various connector G.

Figure 10:
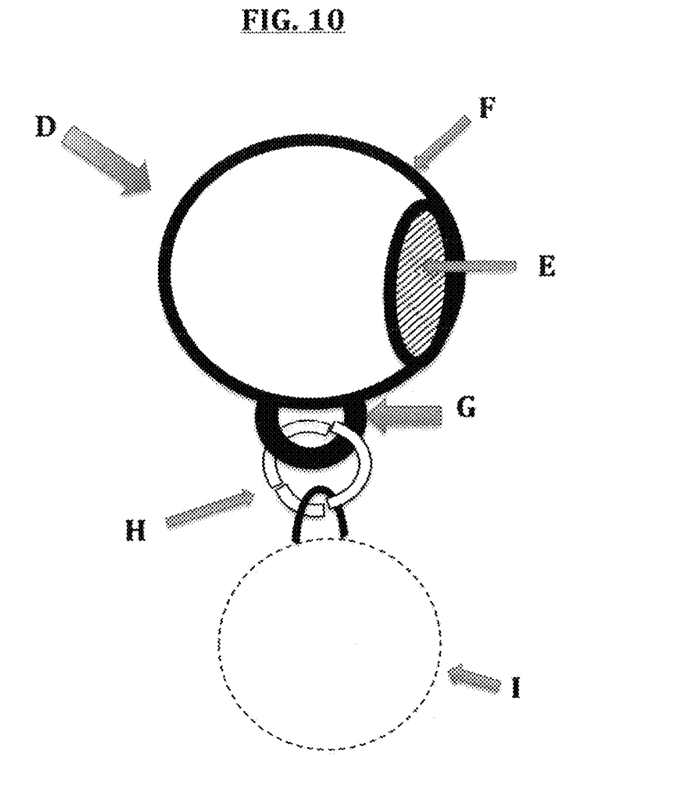
FIG. 10 is a view of a variation and alternative manifestation of the decorative linking element D comprising the decorative housing F, magnetic component E, and various connector G here illustrated as a loop to attach a decorative accessory, ornament, cover, disguise, and or enhancement.

Referring to FIG. 10, is a view of a variation and alternative manifestation of the decorative linking element D comprising the decorative housing F, magnetic component E, and various connector G, in this illustration a loop, to attach a decorative accessory, ornament, cover, disguise, and or enhancement.

Figure 11:
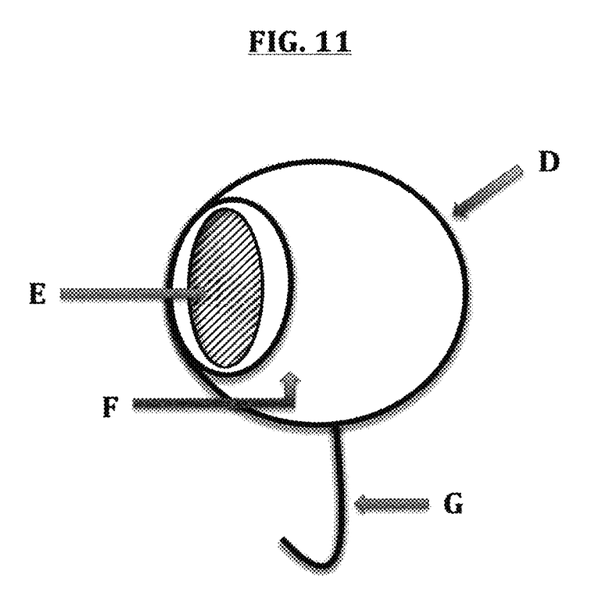
FIG. 11 is view of a variation and alternative manifestation of the decorative linking element D comprising the decorative housing F, magnetic component E, and various connector G here illustrated as a hook to attach a decorative accessory, ornament, cover, disguise, and or enhancement.

Referring to FIG. 11, is a view of a variation and alternative manifestation of the decorative linking element D comprising the decorative housing F, magnetic component E, and various connector G, in this illustration a hook, to attach a decorative accessory, ornament, cover, disguise, and or enhancement.

Figure 12:
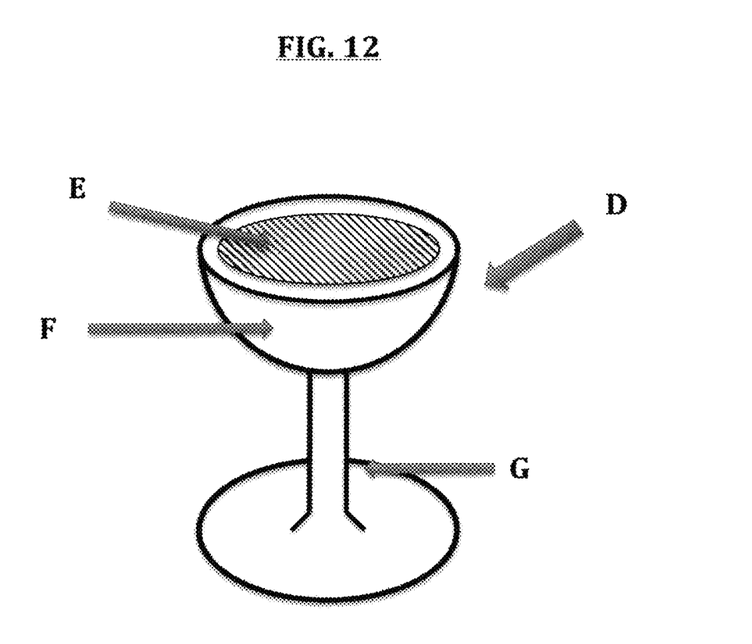
FIG. 12 is view of a variation and alternative manifestation of the decorative linking element D comprising the decorative housing F, magnetic component E, and various connector G here illustrated as a post to attach a decorative accessory, ornament, cover, disguise, and or enhancement.

Referring to FIG. 12, is a view of a variation and alternative manifestation of the decorative linking element D comprising the decorative housing F, magnetic component E, and various connector G, in this illustration a post, to attach a decorative accessory, ornament, cover, disguise, and or enhancement.

CONCLUSION

In conclusion, depictions of the present invention include, in addition to other things, a system apparatus and method for securing decorative accessory, ornament, cover, disguise, and/or enhancement to Christmas trees or other items or fixtures. Those skilled in the art can easily identify that a multitude of adaptations variations modifications alterations and substitutions may be applied in the invention, its use and its configuration to accomplish substantially similar results as those achieved by the embodiments described herein. Therefore, there is no intention to limit the scope of the invention to the disclosed representative forms. Many adaptations, adjustments, modifications and alternative constructions fall within the scope and essence of the presently disclosed invention as demonstrated in the claims.

What is claimed is:

1. An apparatus to attach and secure an ornament or decorative accessory to an item, comprising:
    an adjustable clip comprising three sections, a first end, a second end, and a middle section;
        the adjustable clip being a singular continuous piece of malleable material with magnetic properties and having a constant thickness throughout its length from the first end to the second end; and
    a decorative linking element comprising a magnetic component held within a decorative housing of the decorative linking element and having an exposed side, a connector attached to the decorative linking disposed on the decorative housing, the connector configured to connect to an ornamental device;
    wherein the adjustable clip is configured to be magnetically attached to the decorative housing and wrapped around the item for display of the ornament or the decorative accessory.

2. The apparatus of claim 1, wherein the decorative linking element is configured to magnetically attach to the adjustable clip at any portion from the first end to the second.

3. The apparatus of claim 1, wherein the connector is located at any position on the surface of the decorative housing.

4. The apparatus of claim 2, wherein the connector is one of a hook, a loop, a hole or a post.

5. The apparatus of claim 2, wherein the connector is a hook.

6. The apparatus of claim 2, wherein the connector is a loop.

7. The apparatus of claim 2, wherein the connector is a hole.

8. The apparatus of claim 2, wherein the connector is a post.

* * * * *